Nov. 28, 1961  JEAN-LUC BERRY  3,010,806
SOLID PHASE-FLUID PHASE CONTACTING APPARATUS
Filed July 19, 1960
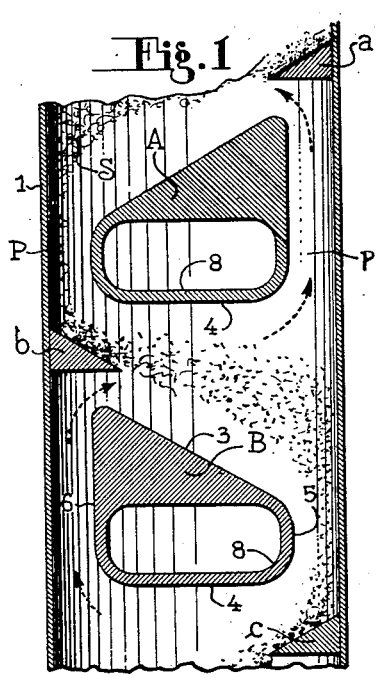
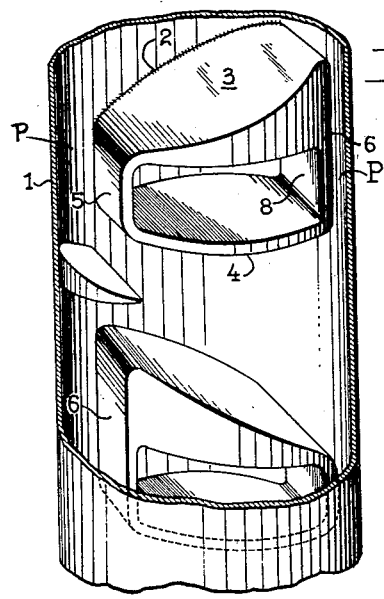
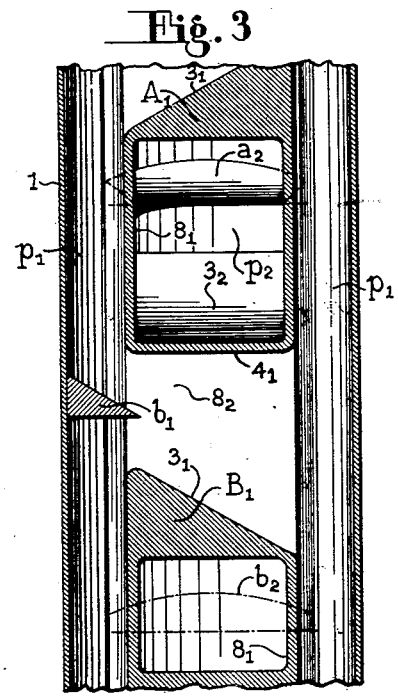
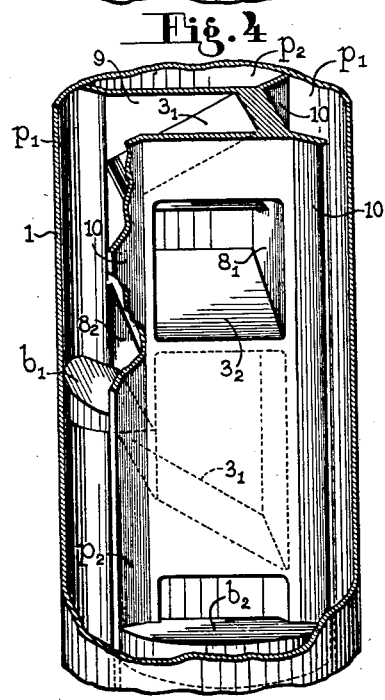
INVENTOR:
JEAN-LUC BERRY
by
Richardson, David and Nerdon
ATTYS.

United States Patent Office 3,010,806
Patented Nov. 28, 1961

3,010,806
SOLID PHASE-FLUID PHASE CONTACTING APPARATUS
Jean-Luc Berry, 21 Rue Gabriel Peri, Firminy, France
Filed July 19, 1960, Ser. No. 43,932
Claims priority, application France Dec. 30, 1955
8 Claims. (Cl. 23—288)

The present invention relates to apparatus for bringing a solid phase into contact with a fluid phase, the solid phase being in finely divided form and the fluid phase being a gas, vapour or liquid. This apparatus may be utilized notably to obtain a heat exchange between the solid and fluid phases, providing chemical reactions between these two phases or causing catalytic acceleration of reactions in the fluid phase by the solid phase.

This application is a continuation-in-part of my co-pending application Serial Number 630,616, filed December 26, 1956, now abandoned.

The object of the invention is to provide such an apparatus whereby an improved contact between the phases, and a more efficient separation of the latter after contact, is obtained.

The apparatus embodying the invention comprises a column provided with a fluid inlet and a solid outlet at the lower end thereof, and a solid inlet and a fluid outlet at the upper end thereof, a series of baffle members defining inclined planes fixed alternately on one side and then the other side of the column, and a series of guide means having substantially the shape of a frustum of a prism, each of said guide means being disposed between two successive inclined planes and having an oblique face inclined in the same direction as the next upper inclined plane, the space between said oblique face and the base of the next upper guide means defining a chamber for contacting and mixing the fluid and the solid, which travels down from said next upper inclined plane onto said oblique face, and the fluid passing between said next upper inclined plane and said oblique face, the mixture thus obtained travelling toward and striking the wall of the column opposite said next upper inclined plane, or a supplemental impact wall attached to the column, and separating into its two constituents, the solid falling onto the next lower inclined plane and the fluid travelling around said next upper guide means and reaching the next upper contact chamber.

Because of the high velocity which it is possible to impart to the fluid, an intimate mixture of fluid and solid is obtained in each contacting chamber and in consequence an excellent contact between the two phases.

Neither of the phases is entrained by the other owing to the impact of the mixture against the wall of the column, or a supplemental impact wall attached to the column to reduce wear of the latter. This impact produces a positive and definite separation of the two phases.

Advantageously, the oblique face of each guide means and the inclined plane disposed immediately thereabove are substantially parallel and inclined at substantially 30° to the horizontal.

In one embodiment, the guide means are hollow and their inner chambers form the contacting chambers of one or more other phase contacting paths interlaced in the first contacting path.

Further features and advantages of the invention will be apparent from the ensuing description with reference to the accompanying drawing, to which the invention is in no way limited.

In the drawing:

FIG. 1 is a fragmentary longitudinal sectional view of an apparatus embodying the invention;

FIG. 2 is a perspective view, partly broken away, of the apparatus shown in FIG. 1, and FIGS. 3 and 4 are views, corresponding to FIGS. 1 and 2, respectively, of a modification illustrating apparatus having two interlaced contacting paths.

In the embodiment shown in FIGS. 1 and 2, the apparatus comprises a hollow vertical column 1 provided with a fluid inlet and a solid outlet at its base, and a solid inlet and a fluid outlet at its upper end, these inlets and outlets not being shown in the drawings. Fixed to the inner wall of the columns are baffle members, the upper surfaces of which define inclined planes, such as baffle members a, b, c, disposed in vertically spaced relation alternately on one side and then the other side of the column. Said inclined planes have preferably an inclination of about 30° to the horizontal. Disposed between successive inclined planes are guide means such as A, B . . . which have substantially the shape of a frustum of a prism and are fixed to the column by welding, for example, as shown at 2. The upper oblique face 3 of each guide means is inclined in the same direction as and is preferably parallel with the next upper inclined plane. The base 4 of each guide means is substantially horizontal and the lateral faces 5 and 6, which extend downwardly from the oblique face 3, respectively, along the lower edge and upper edge of the latter, are substantially vertical. The faces 5 and 6 define with the wall of the column vertical passageways P.

The space between the oblique face 3 of a guide means and the horizontal base 4 of the guide means immediately thereabove forms a contacting chamber in which the solid and fluid are brought into contact.

In each contacting chamber, for example that disposed between the guide means A and B, the process is as follows. The solid S, descending from the region of the oblique face 3 of the guide means A through the corresponding passageway P, falls onto the inclined plane of baffle member b, travels downwardly along the latter, and falls onto the oblique face 3 of the next lower guide means B. The fluid, whose upward path is shown by the dotted arrows, travels at high velocity from the contacting chamber under the guide means B into the passageway P formed between the lateral face 6 of this guide means and the wall of the column 1. As it passes between the horizontally directed under side of baffle member b and the upper end of the guide means B, the fluid is directed horizontally and encounters the solid S, mixes therewith and, owing to its high velocity, entrains the solid across the column. The mixture thus produced travels toward and strikes the opposite wall of the column, or a supplemental impact wall (not shown) attached to the latter. As a result of this impact, the mixture is separated into its constituents; the solid particles fall onto the next lower inclined plane of baffle member c in passing through the passageway P between the face 5 of the guide means B and the wall of the column; the fluid rises in the contacting chamber, passes around the next upper guide means A and enters the next upper contacting chamber, or leaves the column if it has passed the uppermost guide means.

Owing to the successive impacts against the wall of the column and the successive changes in direction of the paths of the phases produced by the baffle members and the guide means, an excellent separation of the constituents is obtained despite the fact that their mixture in the contacting chamber was very intimate.

Considering the size of the guide means, the latter are advantageously made hollow, the chambers 8 reducing their weight.

According to an important embodiment constituting a feature of the invention, the chambers 8 of successive guide means are utilized for the purpose of interlacing in the first phase contacting path one or more other contacting paths, the chambers 8 forming the contacting chambers of these additional contacting paths. FIGS. 3 and 4 show such an embodiment. The elements of each of the phase contacting paths carry the same reference characters as those in FIGS. 1 and 2 with the addition of a subscript 1 for the first contacting path and subscript 2 for the second contacting path. These two paths may be completely independent, and may operate either in series or in parallel. When they operate in parallel, the corresponding inlets and outlets may be common to the two paths. In the series case, each path has its own separate inlets and outlets for the two phases.

As shown in FIGS. 3 and 4, the guide means of the two paths are vertically spaced from each other, the guide means of one path alternating with the guide means of the other path in the vertical arrangement of the guide means. The latter are not exactly superimposed but interpenetrate owing to the necessity of forming on each guide means an oblique face 3, which faces the substantially horizontal lower face 4 of the next upper guide means. Said oblique face $3_2$ (see the guide means $A_1$ in FIG. 3) is therefore formed inside the chamber 8 of the guide means $A_1$ adjacent the lower face $4_1$ of the latter. The angle of inclination of the face $3_2$ is displaced horizontally by an angle of 90° with respect to the angle of inclination of the oblique face $3_1$ of the guide means $A_1$.

The chambers $8_1$ of the first paths are all oriented in the same direction and the chambers $8_2$ of the second path are all oriented in a direction perpendicular to the direction of the chambers $8_1$.

Each path is vertically displaced by a distance corresponding to the height of the vertical face 5 and angularly displaced 90° from the preceding path. In general terms, $n$ interlaced contacting paths may be constructed, each path being vertically displaced the same distance and angularly displaced $\pi/n$ radians from the preceding path.

As these guide means interpenetrate, a simple construction of the column consists in a riser unit 9 in which are formed the successive chambers, the latter being alternately oriented at 90° to one another, the lower face of each chamber being oblique and forming the oblique face of the guide means immediately below. The riser unit 9 is fixed to the wall of the column 1 by four ribs 10 which define four passageways; two passageways $p_1$ are associated with the first contacting path and two passageways $p_2$ associated with the other contacting path.

Each inclined plane, such as plane $b_1$, divides the corresponding passageway $p_1$ into two parts which intercommunicate only by way of the corresponding contacting chamber, that is the chamber $8_2$ formed in the guide means of the second contacting path.

Each contacting path operates in the same manner as that described hereinbefore as is clear from a comparison of FIGS. 1 and 3.

Although specific embodiments of the invention have been described, many modifications and changes may be made therein without departing from the scope of the invention as defined in the appended claims.

What I claim is:

1. Apparatus for contacting a solid phase with a fluid phase, said apparatus comprising a hollow vertical column, said fluid phase being introduced into said column below said solid phase, a series of vertically spaced baffle members fixed to the wall of said column interiorly thereof, alternate ones of said baffle members being disposed above each other and adjacent ones of said baffle members being disposed on opposite sides of said column, the upper face of each baffle member defining an inclined plane which slopes downwardly away from said wall, the lower face of each baffle member being horizontally directed, a series of guide members fixed to said wall and each interposed between two successive ones of said baffle members, each of said guide members having opposite lateral faces spaced from said wall to define two vertically extending passages, the upper face of each guide member being inclined in the same direction as the plane surface of the baffle member immediately above the particular guide member, said upper face being inclined downwardly from one of said two passages to the other passage, the lower face of each guide member being horizontal, two adjacent ones of said guide members defining a mixing chamber therebetween, said solid phase moving downwardly in said column into one of said mixing chambers over the inclined plane of a particular one of said baffle members, said fluid phase moving upwardly through the one of said vertically extending passages which is immediately below said particular baffle member and being directed horizontally by the lower face of said particular baffle member, said fluid phase entraining said solid phase in said mixing chamber and carrying the same horizontally across said column, means defining an impact surface opposite said particular baffle member and extending above the lower end of the inclined upper face of the guide member immediately below said particular baffle member, said entrained material being impacted against said impact surface and moving downwardly through the other of said two passages opposite said last-named vertically extending passage to the inclined plane of the baffle member next below said particular baffle member.

2. Apparatus according to claim 1, wherein at least one of said guide members is hollow.

3. Apparatus according to claim 1, wherein said impact surface is defined by a portion of the wall of said column.

4. Apparatus for contacting solid phases with fluid phases, comprising a column having a substantially vertical axis, inlets for each fluid phase and outlets for each solid phase at the lower end of said column, inlets for each solid phase and outlets for each fluid phase at the upper end of said column, means defining a plurality of imbricated groups of contacting chambers, which chambers are in superimposed relation in said column, each group of contacting chambers being adapted to provide a contacting path for contacting one of the solid phases with one of the fluid phases and being connected to said column in such manner as to form a pair of passageways extending in said column along opposite sides of the latter relative to an axial plane of said column, the pairs of passageways corresponding to the respective groups of contacting chambers being disposed in different intersecting axial planes of said column, a pair of apertures provided in each contacting chamber, one of said pair of apertures connecting its corresponding contacting chamber to one of the pairs of passageways of the group to which the contacting chamber pertains and the other of said pairs of apertures connecting the contact chamber to the other of said pair of passageways, inclined planes fixed to said column in said passageways and located in front of each contacting chamber and partitioning the passageways into several parts, the inclined planes pertaining to each group of contacting chambers being disposed alternately in one passageway and in the other passageway of each pair of passageways corresponding to the group of contacting chambers and extending alternately in one aperture and in the other aperture of the apertures of the contacting chambers of the group, and an oblique face constituting the base of each contacting chamber and extending downwardly from one aperture to the other of the apertures of each contacting chamber in the same direction as the inclined plane extending into the contacting chamber the base of which said inclined plane forms.

5. Apparatus as claimed in claim 4, comprising $n$ groups of chambers ($n$ being an integer equal to at least 2) and in consequence $n$ contacting paths, each contacting path being vertically spaced from the immediately adjacent contacting path a distance equal to the height of the aperture of each contacting chamber toward which said oblique face is downwardly inclined and being disposed in an axial plane of said column which makes angle of about 180°/n with the axial plane in which said immediately adjacent contacting path is disposed.

6. Apparatus as claimed in claim 4, there being provided two groups of contacting chambers and in consequence two contacting paths, each contacting path being vertically spaced from the immediately adjacent contacting path a distance equal to the height of the aperture of each contacting chamber toward which said oblique face is downwardly inclined and being disposed in an axial plane of said column which makes angle of about 90° with the axial plane in which said immediately adjacent contacting path is disposed.

7. Apparatus for contacting solid phases with fluid phases, comprising a column having a substantially vertical axis, inlets for each fluid phase and outlets for each solid phase at the lower end of said column, inlets for each solid phase and outlets for each fluid phase at the upper end of said column, a plurality of contacting chambers for contacting the phases in vertically superimposed relation in said column, each contacting chamber having the shape of a parallelepiped intersected by an oblique face forming the base of the contacting chamber, means connecting the four vertical edges of each of said contacting chambers to said column thereby forming four vertical passageways pairs of which are in opposed relation, a first group of contacting chambers consisting of every other one contacting chamber of said contacting chambers, said first group of contacting chambers being provided with apertures in two lateral opposed faces of each contacting chamber which communicate with one of said pairs of passageways, a second group of contacting chambers consisting of the rest of said contacting chambers, said second group of contacting chambers being provided with apertures on two lateral opposed faces of each contacting chamber which are disposed at 90° to the apertured faces of said first group of contacting chambers and communicate with the other of said pairs of passageways, each group of contacting chambers and the associated pair of passageways forming a contacting path for contacting a fluid phase with a solid phase, and inclined planes fixed to said column in each of said pairs of passageways so as to partition said passageways into a plurality of parts, said inclined planes being disposed alternately in one passageway and in the other of each pair of passageways in front of successive contacting chambers which communicate with said pair of passageways and extending into said contacting chambers through the apertures in the latter, said inclined planes being downwardly toward said axis inclined in the same direction as the oblique face which constitutes the base of the contacting chambers into which they extend.

8. Apparatus as claimed in claim 7, wherein the solid phases and the fluid phases are respectively identical in both contacting paths and there are provided a fluid phase inlet and a fluid phase outlet which are respectively common to the two contacting paths and are each in communication with one of the passageways of each pair of passageways, and a solid phase inlet and a solid phase outlet which are respectively common to two contacting paths and are each in communication with one of the passageways of each pair of passageways.

References Cited in the file of this patent

UNITED STATES PATENTS

| | | |
|---|---|---|
| 2,661,270 | Hudson | Dec. 1, 1953 |
| 2,794,267 | Louis | June 4, 1957 |
| 2,805,845 | Berry | Sept. 10, 1957 |
| 2,817,625 | Schaub | Dec. 24, 1957 |

FOREIGN PATENTS

| | | |
|---|---|---|
| 19,188 of 1909 | Great Britain | Aug. 20, 1909 |
| 509,666 | Canada | Feb. 1, 1955 |